United States Patent Office 3,600,442
Patented Aug. 17, 1971

3,600,442
METHOD OF RECOVERING VANILLIN FROM CRYSTALLIZATION LIQUORS
Wayne Benjamin Gitchel, Rothschild, Donald Guy Diddams, Schofield, and Clarence Anthony Hoffman, Rothschild, Wis., assignors to American Can Company, New York, N.Y.
No Drawing. Filed Jan. 7, 1969, Ser. No. 789,599
Int. Cl. C07c 47/58
U.S. Cl. 260—600                                       6 Claims

ABSTRACT OF THE DISCLOSURE

Vanillin is recovered from aqueous methanol crystallization mother liquors through selective precipitation by serially treating the crystallization liquors with amounts of alkali-metal hydroxide and a zinc or magnesium salt, preferably a zinc salt, stoichiometrically equivalent to the 5-formylvanillin present, causing the 5-formylvanillin to precipitate, and removing the precipitated 5-formylvanillin, and repeating these steps with the same agents in amounts at least stoichiometrically equivalent to the vanillin and acetovanillone present, thereby precipitating the vanillin and acetovanillone. The vanillin is then separated from the acetovanillone by the bisulfite method.

The present invention relates to the recovery of vanillin from aqueous methanol crystallization mother liquors. More particularly it relates to the separation of vanillin by selective crystallization from such mother liquors which also contain 5-formylvanillin, p-hydroxybenzaldehyde and acetovanillone.

PRIOR ART

Natural vanillin is extracted from the vanillin bean and is used as a flavoring. There are several chemical methods for the preparation of vanillin. The partial oxidation of waste sulfite liquor, as described in U.S. Pat. 2,434,626, has generally been the preferred chemical source of vanillin because of economic factors. This method produces a crude vanillin, having many impurities which must be removed before the product can be made sufficiently pure.

Pure vanillin is crystalline, has a melting point range of 82.5–83° C., and is white in appearance. Impurities in vanillin will lower the melting point and cause the liquid phase and solutions of vanillin to be colored. More seriously, the impurities are similar in solubility to vanillin, making separation difficult and rendering the vanillin undesirable for flavoring purposes.

U.S. Pat. 3,049,566 describes a method of purifying the vanillin obtained by lignin oxidation by crystallization using methanol-water solvent. U.S. Pat. 3,049,566 teaches a means of selective crystallization of the residual vanillin remaining in the mother liquor resulting from the first crystallization. The method described in U.S. Pat. 3,049,566 entails treating the crystallization mother liquor with certain metal salts after removal of the methanol. Two different salts are used to effect the separation of first the 5-formylvanillin and then the vanillin and acetovanillone.

DESCRIPTION OF THE INVENTION

The present invention resides in the concept of a process for purifying vanillin present in aqueous methanol crystallization mother liquors by adding thereto a salt of zinc or magnesium and an alkali-metal hydroxide, first in an amount stoichometrically equal to the 5-formylvanillin in the mother liquor, thereby precipitating it, removing the precipitated 5-formylvanillin and then repeating the procedure to precipitate the vanillin and acetovanillone. The vanillin can be separated from aceto-vanillone by conventional means, e.g., the bisulfite method described in U.S. Pat. 3,049,566.

The metal cation is added in the form of a salt. Any nontoxic pharmaceutically acceptable anion forming a soluble salt with zinc or magnesium may be used. Such anions include halides, sulfates, acetates, nitrates, ect. In the preferred embodiment of this invention, a zinc salt is employed, preferably zinc sulfate. Any of the alkali-metal hydroxides are operative. Sodium hydroxide is preferred.

An essential feature of the present method for the selective crystallization of vanillin is the use of the selected metal cation and the alkali-metal hydroxide in an amount stoichiometrically equal to the 5-formylvanillin in the mother liquor in order to effect the selective separation of the 5-formylvanillin. The vanillin and acetovanillone are then subsequently precipitated from the mother liquors with additional amounts of the alkali-metal hydroxide and metal salts.

The insoluble metal salts of vanillin and the vanillin by-products form better from a soluble salt thereof rather than the free phenolic form. When an alkali-metal hydroxide is added to the mother liquors, an alkali-metal phenolate is formed. This salt readily reacts with the metal salt added to the mother liquors to form an insoluble salt of zinc or magnesium.

It is essential to first add amounts of the metal salt and base stoichiometrically equal to the 5-formylvanillin to satisfactorily effect the desired separations. In the presence of an amount of base and metal salt stoichometrically equal to the 5-formylvanillin the 5-formylvanillin will preferentially form an insoluble salt and precipitate first. At the same time, little, if any, of the vanillin or acetovanillone will precipitate. Therefore, a sharp selective separation is achieved.

This procedure is then repeated to separate the vanillin and acetovanillone, preferably using amounts of base and metal salt at least stoichiometrically equal to the amount of those compounds which are present in the mother liquors. Vanillin and acetovanillone will precipitate together, but they can readily be separated by conventional means, e.g., dissolve salts in aqueous sulfuric acid, extract with ethylene dichloride and extract the vanillin therefrom with aqueous sodium bisulfite, neutralize the bisulfite solution and extract the free vanillin with ethylene dichloride which is then distilled therefrom, leaving pure vanillin as a residue. Alternately, the purified vanillin can be combined with vanillin derived from the first crystallization and purified along with the main batch material.

The p-hydroxybenzaldehyde is left in solution and can be separately recovered therefrom. If amounts of base and salt stoichiometrically equal to the vanillin and acetovanillone are used, a significant amount of insoluble salt of the p-hydroxybenzaldehyde is not formed. However, even if more than stoichiometric amounts are employed, salts of p-hydroxybenzaldehyde will be formed, but will not precipitate at the operating temperature because of its greater solubility.

The order of addition of the salt and alkali-metal hydroxide does not appear to affect the end result. If the metal cation containing salt is added first, a "salting" out of the organics as an oil occurs; but after the alkali-metal hydroxide is added, re-solution occurs and the results are the same as addition in the reverse order.

The sharp separation of the vanillin is also dependent upon temperature. Solubilities of the insoluble vanillin-metal salts in the mother liquors are only about 10 g./l. (calculated as vanillin) whereas the corresponding salts of p-hydroxybenzaldehyde are substantially more soluble. Hence, around 95 percent of the vanillin can be precipitated without precipitation of p-hydroxybenzaldehyde if the temperature is held above 40° C. The 5-formylvanillin solubilities are about 1 to 3 g./l. in the hot mother liquors. Therefore, 80 to 95 percent of the 5-formylvanillin can be selectively precipitated if strict control is kept on the quantities of reactants.

It has been found that temperatures must be above 40° C. Temperatures up to the boiling point of the solvent may be used, but the preferred temperature range is about 50 to 75° C.

Because stoichiometric quantities of the reactants are used, it is necessary to know the distribution of components in the starting mother liquor. This can be done by standard analytical means.

The determination of the distribution of materials can be done by ultraviolet spectro-photometric methods. The spectra of the aldehyde constituents, i.e., vanillin, p-hydroxybenzaldehyde, and 5-formylvanillin exhibit sufficient points of difference to provide a quantitative analysis. In acidic aqueous solution, the following specific absorptivities ($a^{1\ millimole/liter}$) were observed.

| | Wave length, m$\mu$ | | |
|---|---|---|---|
| | 246 | 283 | 309 |
| $a^{1\ millimole/l.}$ for vanillin | 1.76 | 9.98 | 9.25 |
| $a^{1\ millimole/l.}$ for p-hydroxybenzaldehyde | 2.33 | 15.11 | 2.78 |
| $a^{1\ millimole/l.}$ for 5-formylvanillin | 22.10 | 8.50 | 3.80 |

Acetovanillone has a spectrum identical with vanillin in the aqueous acidic solution; hence, must be separated from the aldehyde by adding sodium bisulfite to an aqueous solution and extracting with a solvent such as chloroform or ethylene dichloride.

A sample was diluted to give about 0.05 millimoles total compounds in a 0.02 N HCl solution and the absorbance at 246, 283 and 309 m$\mu$ were observed. A separate aliquot was diluted and made up in 10 percent sodium bisulfite and acetovanillone extracted by a two-funnel countercurrent method with ethylene dichloride. The acetovanillone was removed from the ethylene dichloride by extraction with 1 N NaOH, the aqueous extract neutralized with 1 N HCl, sodium bisulfite added to give 50 g./l. and the solution made to standard volume. The absorbance at 303 m$\mu$ was observed and the acetovanillone concentration calculated, using $$a^{1\ mm./l.}(303\ m\mu) = 7.55$$

The observed $A_{246}$, $A_{283}$ and $A_{309}$ were then corrected for the contribution of acetovanillone and the concentrations of the aldehydes calculated from the above equations.

As a nalternate procedure, gas chromatographic methods, as described by N. G. Johansen, J. Gas Chromatography, pages 202–203 of June 1965, can be used.

The following is illustrative of the invention, which is not limited thereto:

EXAMPLE 1

Recovery of compounds from lignin oxidation vanillin crystallization mother liquors Mother liquors obtained from the crystallization of 1450 grams of distilled vanillin in 2170 ml. of 40 percent aqueous methanol contain on the average about 210±20 g. vanillin, 91±5 g., p-hydroxybenzaldehyde (p-HO), 20±5 g. 5-formylvanillin (5–F), and 13±3 g. acetovanillone.

The object of the separation procedure was to isolate therefrom a product assaying as follows:

| | Percent |
|---|---|
| Vanillin | 90 (min.) |
| p-HO | 6 (max.) |
| 5–F | 2 (max.) |
| Acetovanillone | 2 (max.) |

The mother liquors from such a run were analyzed and found to contain:

216 g. vanillin (1.42 moles)
91 g. p-HO (0.746 mole)
20 g. 5–F (0.111 mole)
13 g. acetovanillone (0.0783 mole)
430 cc. MeOH
2100 cc. volume The materials used were:

9.0 $ZnSO_4$ (0.56 mole)
4.5 g. NaOH in 20 cc. solution (0.111 mole)
121 g. $ZnSO_4$ (0.75 mole)
60.0 g. NaOH in 200 cc. solution (1.50 moles)
85 g. 96 percent $H_2SO_4$ in 300 cc. aqueous solution
3000 cc. ethylene dichloride
2000 g. of 200 g./l. $NaHSO_3$
435 g. 96 percent $H_2SO_4$ The mother liquor was warmed to 50–60° C., in a 5-liter 3-neck flask, equipped with a stirrer, thermometer and condenser. 9.0 g. of $ZnSO_4$ was dissolved therein. 4.5 g. of NaOH in 20 cc. of solution was then added to the agitated filtrate solution. A yellow precipitate formed. Agitation was continued for 30 minutes. The precipitate was filtered while hot, washed with two 25 cc. portions of hot (50–60° C.) water and dried.

The 2170 cc. of combined mother liquor and washes contained 215 g. vanillin, 91 g. p-hydroxybenzaldehyde, 3 g. 5-formylvanillin, and 13 g. acetovanillone.

The dry precipitate, a light yellow powder, weighed about 20 grams and consisted of less than 5 percent vanillin, no p-hydroxybenzaldehyde, 80±5 percent 5-formylvanillin, less than 2 percent acetovanillone, and 15 percent ash (zinc).

121 g. zinc sulfate and 60 g. sodium hydroxide in a 200 cc. solution was added to the filtrate at 50–60° C. A precipitate formed and the products were stirred for 30 minutes to permit the reactions to go to completion.

The precipitate was filtered while hot and washed with two 150 cc. portions of hot (50–60° C.) water.

The 2200 cc. of combined mother liquor and washes contained 86 grams p-hydroxybenzaldehyde, less than 2 grams 5-formylvanillin, less than 20 grams vanillin, and less than 3 grams acetovanillone.

The dry, yellow, granular precipitate weighed about 272 grams and consisted of 72 percent vanillin, less than 2 percent p-hydroxybenzaldehyde, less than 1 percent 5-formylvanillin, less than 3 percent acetovanillone, and 18 percent ash (zinc).

The wet precipitate was mixed with 85 grams of 96 percent $H_2SO_4$ (10 percent molar excess) in a 300 cc. aqueous solution and reacted at 50–60° C., for 30 minutes. The mixture was extracted with three 500 cc. portions of ethylene dichloride. The ethylene dichloride extract was washed with two 100 cc. portions of 50–60° C. water. The aqueous residue of 500 cc. contained about 1 g. vanillin. The ethylene dichloride layer of 1500 cc. contained 195 grams vanillin.

The ethylene dichloride was extracted with four 500 cc. portions of sodium bisulfite in water (200 grams per liter) at 25–30° C. The extracted ethylene dichloride layer contained less than 2 grams vanillin. The aqueous layer of approximately 2200 cc. contained 193 grams vanillin.

445 grams of 96 percent $H_2SO_4$ (10 percent excess) was added, cautiously, with stirring, to the vanillin bisulfite solution and the whole mixture was boiled with stirring until free of $SO_2$ and ethylene dichloride. The aqueous mixture was cooled to 50° C., and extracted with three 500 cc. portions of ethylene dichloride to remove all vanillin. The ethylene dichloride was then washed with three 100 cc. portions of hot water (50–60° C.). The aqueous phase of approximately 2000 cc. contained less than 3 grams vanillin. The ethylene dichloride layer of about 2150 cc. contained 175 grams vanillin.

The ethylene dichloride was removed by distillation, under vacuum (25 inches mercury), to give the following: a distillate of approximately 2000 cc. of ethylene dichloride and a residue of 198 grams of 96 percent pure vanillin with less than 1 percent ethylene dichloride.

The residue, ethylene dichloride, was removed by drying at 40° C. The recovered vanillin (190±5 grams) fraction consisted of 96 percent vanillin, less than 1 percent acetovanillone, less than 1 percent 5-formylvanillin and less than 3 percent p-hydroxybenzaldehyde.

In a like manner, salts such as $Zn(NO_3)_2$, $MgSO_4$, $MgCl_2$ and $ZnCl_2$ can be substituted for the $ZnSO_4$ and other bases, e.g., KOH, can be substituted for the NaOH.

While the invention has been illustrated by specific embodiments, its scope is limited only by the appended claims.

What is claimed is:

1. A method of recovering vanillin from aqueous methanol crystallization mother liquors containing vanillin, 5-formylvanillin, p-hydroxybenzaldehyde and acetovanillone which comprises:
    (a) adding to said mother liquors, at a temperature from 40° C., to the boiling point of the mother liquors, an amount of each of an alkali-metal hydroxide and a water-soluble salt of a cation selected from the group consisting of zinc and magnesium, stoichiometrically equal to the amount of 5-formylvanillin present in the mother liquors, thereby precipitating the 5-formylvanillin as an insoluble solid salt of the selected cation;
    (b) separating the resultant precipitate;
    (c) adding to the separated liquid phase, at a temperature from 40° C., to the boiling point of the liquid phase an amount of each of an alkali-metal hydroxide and a water-soluble salt of a cation selected from the group consisting of zinc and magnesium, each at least stoichiometrically equal to the combined amount of vanillin and acetovanillone, thereby precipitating the vanillin and acetovanillone as insoluble solid salts of the selected cation;
    (d) separating the precipitate;
    (e) decomposing the metal salts of the precipitated vanillin and acetovanillone with acid; and
    (f) separating the vanillin from the acetovanillone.

2. A method according to claim 1, wherein the mother liquors and separated liquid phase are at a temperature from 50–75° C.

3. A method according to claim 1, wherein the cation is zinc.

4. A method according to claim 2, wherein said soluble salt is zinc sulfate.

5. A method according to claim 1, wherein the alkali-metal hydroxide is sodium hydroxide.

6. A method according to claim 1, wherein said soluble salt is zinc sulfate and said alkali metal hydroxide is sodium hydroxide.

References Cited

UNITED STATES PATENTS 3,049,566  8/1962  Schoeffel _____ 260—600

OTHER REFERENCES

Kobe et al.: Jour. Phys. Chem., vol. 44 (1940), pp. 629–633.

BERNARD HELFIN, Primary Examiner